United States Patent [19]

Bennett

[11] Patent Number: 5,428,352
[45] Date of Patent: Jun. 27, 1995

[54] CLOSED LOOP CIRCUIT FOR A DIFFERENTIAL CAPACITIVE SENSOR

[75] Inventor: Paul T. Bennett, Phoenix, Ariz.

[73] Assignee: Motorola, Inc., Schaumburg, Ill.

[21] Appl. No.: 827,912

[22] Filed: Jan. 31, 1992

Related U.S. Application Data

[63] Continuation-in-part of Ser. No. 817,216, Jan. 6, 1992, abandoned.

[51] Int. Cl.$^6$ ................................................. H01G 5/16
[52] U.S. Cl. ............................ 340/870.37; 340/370.43; 324/661; 324/679; 324/684; 73/517 R; 73/517 B
[58] Field of Search .............. 340/870.37, 870.43; 324/658, 660, 661, 679, 684, 686; 307/116, 121, 109; 361/230, 290, 300, 330; 73/510, 514, 517 R, 562.52, 517 B

[56] References Cited

U.S. PATENT DOCUMENTS

| | | | |
|---|---|---|---|
| 4,054,833 | 10/1977 | Briefer | 324/679 |
| 5,048,165 | 8/1991 | Cadwell | 340/870.37 |
| 5,095,752 | 3/1992 | Suzuki et al. | 73/517 R |

OTHER PUBLICATIONS

Henrion et al; "Wide Dynamic Range Direct Digital Accelerometer" IEEE Solid State Sensor and Actuator Workshop; 1990; pp. 153–157.

Primary Examiner—Michael Horabik
Attorney, Agent, or Firm—Rennie William Dover

[57] ABSTRACT

A closed loop circuit for controlling a differential capacitive sensor has been provided wherein the differential capacitive sensor includes a rigid top and bottom plate, and a movable middle plate. The closed loop circuit has a clock period which is divided into three separate sub-periods: the force period, the reset period and the sense period. During the force period, a top or a bottom electrostatic force is applied such that the middle plate is attracted towards the top plate or the bottom plate, respectively. During the reset period, substantially equal voltages are applied to all three plates. Finally, during the sense period, the voltage on the middle plate is sensed to determine whether the middle plate is closer to the top plate or to the bottom plate. Further, the result during the sense period will be utilized to determine whether to apply a top force or a bottom force during the next subsequent force period.

6 Claims, 3 Drawing Sheets

CLOSED LOOP CIRCUIT FOR A DIFFERENTIAL CAPACITIVE SENSOR

FIELD OF THE INVENTION

This application is a continuation-in-part of an earlier filed and abandoned application having Ser. No. 07/817,216 and filing date of Jan. 6, 1992.

This invention relates to circuits and, more particularly, to a closed loop circuit for a differential capacitive sensor.

BACKGROUND OF THE INVENTION

In general, a differential capacitive sensor is a surface micromachine device typically having three electrically isolated layers of polysilicon wherein at least one application for a differential capacitive sensor is accelerometers. The first layer of the sensor is typically rigidly attached to the substrate and is electrically isolated from the substrate by an oxide layer. The first layer forms the bottom plate of a three layer capacitor. The second layer of the sensor is sandwiched between the first layer and a third layer and is typically supported by a set of beams running down to the first layer. The second layer forms the middle plate. The third layer is above the first two layers and is supported in such a manner as to remain rigid. The third layer forms the top plate of the three layer capacitor. The middle plate is free to move in response to an applied force. Thus, an accelerating force produces a perceptible change in the capacitance between the first and second plates and the second and third plates. Further, an electrostatic force, for example, one generated by a voltage source, can also cause the middle plate to move.

If the middle plate moves towards the bottom plate, the capacitance between the middle plate and the bottom plate increases (because the distance has decreased), while the capacitance between the top plate and the middle plate correspondingly decreases. By maintaining the middle plate at a central position with a balanced amount of top and bottom electrostatic forces, external accelerating forces acting on the middle plate can be measured.

Circuits that sense a capacitive change due to motion of the middle plate and exert no appreciable electrostatic force to bring back the middle plate to a central position rely on the mechanical elasticity of the beams supporting the middle plate to provide a means of balancing external accelerating forces. These sensor circuits are sensitive to manufacture variability from sensor to sensor.

Further, circuits that sense motion but do not counteract the motion with an electrostatic force are referred to as open loop circuits. On the other hand, a closed loop circuit provides a means of monitoring the middle plate at a central position.

One example of a closed loop circuit for maintaining the middle plate at a central position is fully described in an IEEE Solid-State Sensor and Actuator Workshop article entitled "Wide Dynamic Range Direct Digital Accelerometer" by Widge Henrion et al. The accelerometer is made by bonding three wafers together. The middle plate includes two electrically isolated plates wherein a first plate is used for sensing the position of the middle plate and a second plate is used for applying an electrostatic force to the middle plate. However, this accelerometer requires numerous masking layers and is difficult to manufacture.

Hence, what is needed is a circuit for sensing and controlling the differential capacitance between the first and second plates and the second and third plates with an electrically common second plate.

SUMMARY OF THE INVENTION

Briefly, there is provided a closed looped circuit for a differential capacitive sensor, the differential capacitive sensor having first, second and third terminals, the closed loop circuit comprising a switching circuit having a plurality of inputs, a plurality of outputs, and a plurality of control inputs, the plurality of inputs being responsive to a plurality of voltages, a first one of the plurality outputs being coupled to the first terminal of the differential capacitive sensor, a second one of the plurality of outputs being coupled to the second terminal of the differential capacitive sensor, a third one of the plurality of outputs being coupled to the third terminal of the differential capacitive sensor; a comparator circuit having first and second inputs and an output, the first input of the comparator circuit being coupled to the second terminal of the differential capacitive sensor, the second input of the comparator circuit being coupled to receive a first reference voltage; a flip-flop circuit having a data input, a clock input and an output, the data input of the flip-flop circuit being coupled to the output of the comparator circuit, and the output of the flip-flop circuit being coupled to provide an output data signal; and a logic circuit having first and second inputs and a plurality of outputs, said first input of the logic circuit being coupled to the output of the flip-flop circuit, the second input of the logic circuit being coupled to receive a clock signal, a portion of the plurality of outputs of the logic circuit being respectively coupled to the plurality of control inputs of the switching circuit, and one of the plurality of outputs of the logic circuit being coupled to the clock input of the flip-flop circuit.

The present invention will be better understood from the following detailed description taken in conjunction with the accompanying drawings.

DETAILED DESCRIPTION OF THE PREFERRED EMBODIMENT

Figure 1:
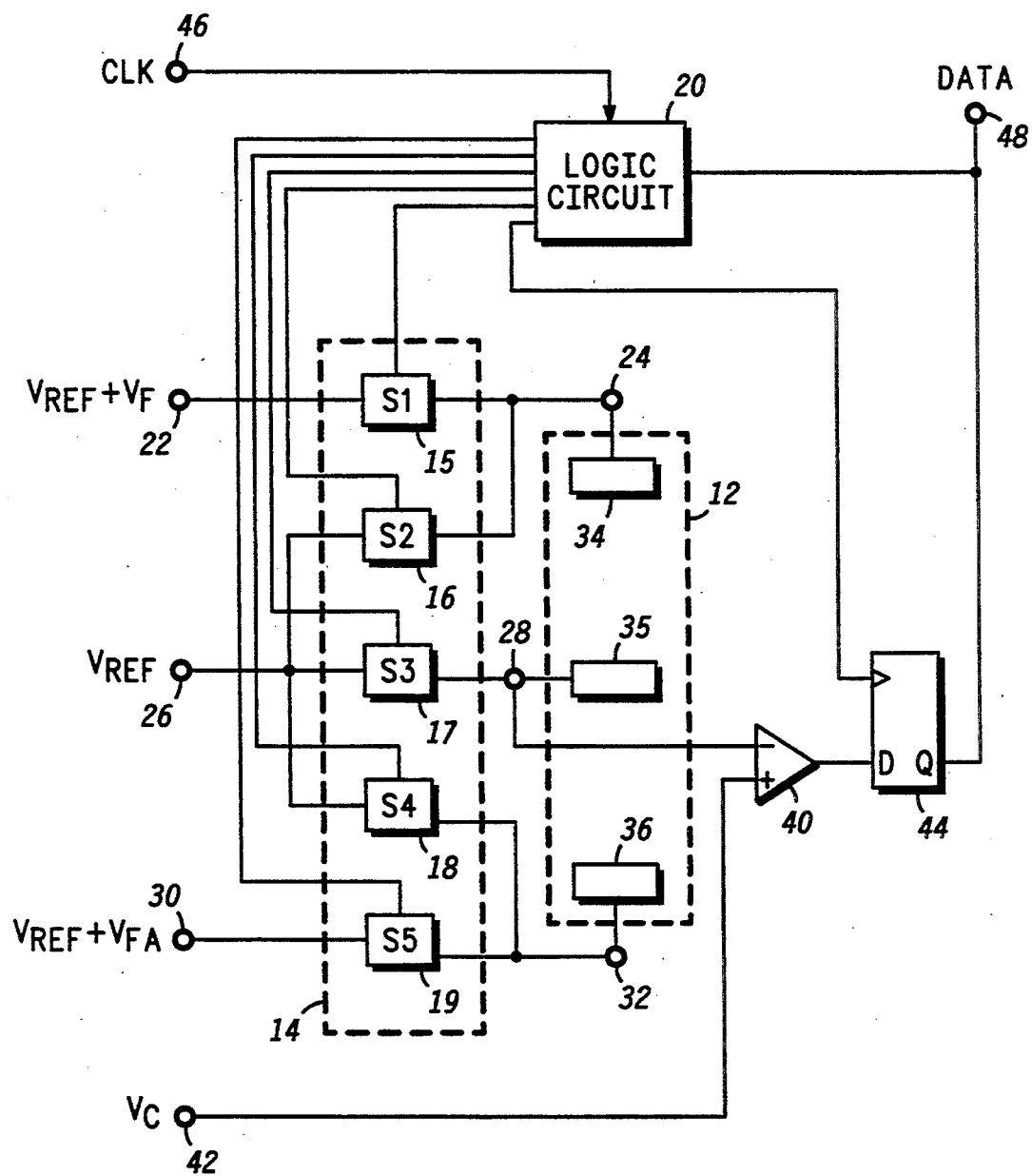
FIG. 1 is a block diagram of a first embodiment of a closed looped circuit for controlling a differential capacitive sensor.

Referring to FIG. 1, there is illustrated a block diagram of a first embodiment of a closed looped circuit for controlling differential capacitive sensor 12. The closed looped circuit also includes switching matrix 14 which includes switches 15–19 as denoted by S1-S5. The state of switches 15–19 (open state or closed state) are controlled via the first-fifth output logic signals from logic circuits 20.

The first terminal of switch 15 is coupled to terminal 22 at which the voltage ($V_{REF}+V_F$) is applied. The second terminals of switches 15 and 16 are coupled to terminal 24. The first terminals of switches 16, 17 and 18 are coupled to terminal 26 at which the voltage $V_{REF}$ is applied. The second terminal of switch of 17 is coupled to terminal 28. The first terminal of switch 19 is coupled to terminal 30 at which the voltage ($V_{REF}+V_{FA}$) is applied. The second terminals of switches 18 and 19 are coupled to terminal 32. The control terminals of switches 15–19 are respectfully coupled to logic signals appearing at the output of logic circuit 20. It is worth noting that voltages $V_F$ and $V_{FA}$ may be substantially equal.

Differential capacitive sensor 12 is a surface micromachine device consisting of three electrically isolated layers of polysilicon. First layer 36 is rigidly attached to a substrate but is electrically isolated from the substrate by an oxide layer. First layer 36 forms the bottom plate of a three layer capacitor and is coupled to terminal 32. Second layer 35 is sandwiched between first layer 36 and third layer 34 and is typically supported by a set of beams running down to the first layer. Second layer 35 forms the middle plate of the three layer capacitor and is coupled to terminal 28. Third layer 34 is over top the first two layers and is supported in such a manner as to remain rigid. The third layer forms the top plate of the three layer capacitor and is coupled to terminal 24. It is understood that the three layers (34–36) inherently form two capacitors: 1) a top capacitor between layers 34 and 35 and 2) a bottom capacitor between layers 35 and 36 wherein middle plate 35 is a common plate to both capacitors. Further, the middle plate is free to move in response to an applied force. Thus, an accelerating force may cause plate 35 to move towards plate 34 (or 36) and, thus, produce a perceptible change in the original capacitance between the first and second layers and the second and third layers. In addition, an electrical static force generated by a voltage source, for example, can also cause motion of the middle plate.

The closed loop circuit further includes comparator 40 having a first input coupled to terminal 28 and a second input coupled to terminal 42 at which the voltage $V_C$ is applied. The output of comparator 40 is coupled to the data input of D flip-flop 44. The clock input of D flip-flop 44 is responsive to a sixth output logic signal of logic circuit 20 wherein the sixth output logic signal is a latching signal for D flip-flop 44. The output of D flip-flop 44 is coupled to terminal 48 for providing output signal DATA. The output of D flip-flop 44 is coupled back to a first input of logic circuit 20. Further, the second input of logic circuit 20 is coupled to terminal 46 at which clock signal CLK is applied.

Briefly, as middle plate 35 moves towards the bottom plate 36, the capacitance between the middle plate and the bottom plate increases, while the capacitance between the top plate and the middle plate decreases. As a result, the voltage at terminal 28 which is coupled to middle plate 35, will correspondingly change to reflect the movement of middle plate 35. Depending upon whether the voltage appearing at terminal 28 is greater than or less than the voltage appearing at terminal 42, a logic one or zero will be respectively applied to the data input of D flip-flop 44. Further, once D flip-flop 44 is clocked, the logic one or zero will appear at the input of logic circuit 20 thereby determining the states of switches 15–19.

In operation, each clock cycle is broken up into three periods; the force period, the reset period and the sense period wherein it is understood that proper multiplexing is required to ensure proper operation. During the force period, proper voltages are applied at terminals 24, 28 and 32 via switches 15–19 and voltages ($V_{REF}+V_F$), $V_{REF}$, and ($V_{REF}+V_{FA}$) such that a proper electrostatic force is applied to middle plate 35 so that it will remain centrally positioned between top plate 34 and bottom plate 36. It is worth noting that electric charges on the plates of a capacitor are always of unlike sign and, thus, electrostatic forces are only attractive and not repellant. Further, it should be realized that force to middle plate 35 is applied only during the force period which prevents any latch up problems.

If middle plate 35 is closer to top plate 34 than it is to bottom plate 36, a predetermined voltage must be applied across plates 35 and 36 so as to attract middle plate 35 towards bottom plate 36. This may be called a bottom force. Further, at the same time, substantially zero volts would be applied across plates 34 and 35 so as to deactivate any electrostatic force therebetween. On the other hand, if middle plate 35 is closer to bottom plate 36 than it is to top plate 34, a predetermined voltage must be applied across plates 34 and 35 so as to attract middle plate 35 towards top plate 34. This may be called a top force. Further, substantially zero volts would be applied across plates 35 and 36 so as to deactivate any electrostatic force therebetween.

Therefore, during the force period we are either applying a top force to move middle plate 35 towards top plate 34, or a bottom force to move middle plate 35 towards bottom plate 36. This is accomplished by utilizing the voltages appearing at terminals 22, 26 and 30 and applying them in a predetermined fashion to terminals 24, 28 and 32 via switches 15–19.

For example, suppose that the previous logic state of signal DATA is a logic one which implies that an upward force is needed to move middle plate 35 towards top plate 34 as will be described hereinafter. Logic circuit 20 functions to close switches 15, 17 and 18 while opening switches 16 and 19. This essentially applies differential voltage $V_F$ across terminals 24 and 28 and substantially zero voltage across terminals 28 and 32. In other words, a top electrostatic force would be applied to move middle plate 35 towards top plate 34 as desired.

On the other hand, suppose that the previous logic state of signal DATA is a logic zero which implies that a downward force is needed to move middle plate 35 towards bottom plate 36 as will be described hereinafter. Logic circuit 20 functions to close switches 16, 17 and 19 while opening switches 15 and 18. This essentially applies differential voltage $V_{FA}$ across terminals 28 and 32 and substantially zero voltage across terminals 24 and 28. In other words, a bottom electrostatic force would be applied to move middle plate 35 towards bottom plate 34 as desired.

The reset period follows the force period. During the reset period, all plates are reset to a common voltage, for example, $V_{REF}$. Thus, during the reset period, logic circuit 20 functions to close switches 16, 17, and 18 and to open switches 15 and 19. As a result, voltage $V_{REF}$ is applied to terminals 24, 28 and 32 and, thus, substantially zero voltage is applied across plates 34 and 35 and plates 35 and 36. The reset period is important because it is immediately followed by the sense period and without a reset period, charge injection effects inside switches 15–19 may interfere with proper operation of the circuit.

The sense period is utilized to determine whether middle plate 35 is closer to top plate 34 or to bottom plate 36. Let us first begin by utilizing simple nodal analysis to express voltage $V_C$ as being substantially equal to the value of the voltage appearing at terminal 28 when plate 35 is centrally located between plates 34 and 36, as shown in equation 1.

$$V_C = (V_{24} \times C_{TO} + V_{32} \times C_{BO})/(C_{TO} + C_{BO}) \qquad \text{EQN. 1}$$

where $V_{24}$ is the voltage applied to top plate 34;
$V_{32}$ is the voltage applied to bottom plate 36;
$C_{TO}$ is the original capacitance between top plate 34 and between middle plate 35 when middle plate 35 is centrally positioned between plates 34 and 36; and
$C_{BO}$ is the original capacitance between middle plate 35 and bottom plate 36 when middle plate 35 is centrally positioned-between plates 34 and 36.

Further, the voltage at terminal 28 ($V_{28}$) during a given sense period can be expressed as shown in equation 2.

$$V_{28} = (V_{24} \times C_T + V_{32} \times C_B)/(C_T + C_B) \qquad \text{EQN. 2}$$

where $C_T$ is the capacitance between top plate 34 and middle plate 35 during a given sense period; and $C_B$ is the capacitance between middle plate 35 and bottom plate 36 during a given sense period.

As an example, let us assume that plate 35 has moved above its central position (due to some force) such that middle plate 35 is closer to top plate 34 than it is to bottom plate 36. Further, let ($C_T = 2C_{TO}$) and accordingly ($C_B = \frac{1}{2} \times C_{BO}$). Also, during the sense period, logic circuit 20 will function to open switches 16, 17 and 19, and to close switches 15 and 18. As a result, the voltages applied to terminals 24 and 32 are as follows:

$$V_{24} = (V_{REF} + V_F) \qquad \text{EQN. 3}$$

$$V_{32} = V_{REF} \qquad \text{EQN. 4}$$

Initially, let middle plate 35 be centrally positioned between plates 34 and 36 and $C_{TO} = C_{BO}$ such that voltage $V_C$ of EQN. 1 is substantially equal to ($V_F/2 + V_{REF}$). Upon solving for $V_{28}$ with the above conditions, the following expression is obtained:

$$V_{28} = (4/5) \times V_F + V_{REF} \qquad \text{EQN. 5}$$

From EQN. 5, it can easily be seen that the value of the voltage at terminal 28 is greater than the voltage $V_C$ which was equal to ($V_F/2 + V_{REF}$). Further, in general, given the switch settings during the sense period to restrain voltages $V_{24}$ and $V_{32}$ to the values as shown in EQNS. 3 and 4, the value of the voltage appearing at terminal 28 will always be greater than voltage $V_C$ whenever $C_T > C_{TO}$ (that is, whenever plate 35 is located above the central position).

By a similar example, it also can be shown that the voltage appearing at terminal 28 will be less than voltage $V_C$ whenever plate 35 is located below the central position (whenever $C_T < C_{TO}$).

As a result, when middle plate 35 is above the central position ($V_{28} > V_C$), comparator 40 will apply a logic zero to the data input of D flip-flop 44. Further, upon subsequent clocking of D flip-flop 44, the logic zero will be supplied to the input of logic circuit 20. Therefore, during the next force period, logic circuit 20 will function to set switches 15-19 so as to provide proper voltages at terminals 24, 28 and 32 in order to provide a electrostatic force to move middle plate 35 towards bottom plate 36, as aforedescribed during the force period.

On the other hand, if middle plate 35 is below the central position ($V_{28} < V_C$), comparator 40 will apply a logic one to the data input of D flip-flop 44. Further, upon subsequent clocking of D flip flop 44, the logic one will be supplied to the input of logic circuit 20. Therefore, during the next force period, logic circuit 20 will function to set switches 15-19 so as to provide proper voltages at terminals 24, 28 and 32 in order to provide an electrostatic force so as to move middle plate 35 towards top plate 34.

Referring to Table 1, the switch settings for the three different portions of the clock are summarized.

TABLE 1

| | Settings for switches S1-S5 for each portion of the clock period. | | |
|---|---|---|---|
| | FORCE PERIOD | RESET | |
| | DATA = 1 | DATA = 0 | PERIOD | SENSE PERIOD |
| S1 | C | O | O | C |
| S2 | O | C | C | O |
| S3 | C | C | C | O |
| S4 | C | O | C | C |
| S5 | O | C | O | O |

From Table 1, the switch settings during the force period are a function of the previous logic state of signal DATA. If the previous logic state was a logic one, then switches 15-19 (S1-S5, respectively) are set up to apply a force to move middle plate 35 towards top plate 34. On the other hand, if the previous logic state was a logic zero, then switches 15-19 (S1-S5) are set up to apply a force to move middle plate 35 towards bottom plate 36.

During the reset period, switches S1-S5 are set to provide substantially equal voltages to terminals 24, 28 and 32.

Further, during the sense period, switches S1-S5 are set up such that $V_{28} > V_C$ if middle plate 35 is above the central position, or $V_{28} < V_C$ if middle plate 35 is below the central position.

In summary, during the force period, an electrostatic force is applied such that middle plate 35 is attracted towards top plate 34 or bottom plate 36 depending upon the previous logic state of signal DATA. During the reset period, substantially equal voltages are applied to terminals 24, 28 and 32 so as to apply substantially zero voltage across plates 34 and 35 and across plates 35 and 36. This is used to negate any charge injection effects inside switches 15-19. Finally, during the sense period, the voltage on middle plate 35 is sensed to determine whether middle plate 35 is closer to top plate 34 or bottom plate 36. Further, depending upon the value of the sensed voltage at terminal 28, signal DATA will either be a logic zero or a logic one which will be used to set switches 15-19 for the subsequent force period.

Figure 2:
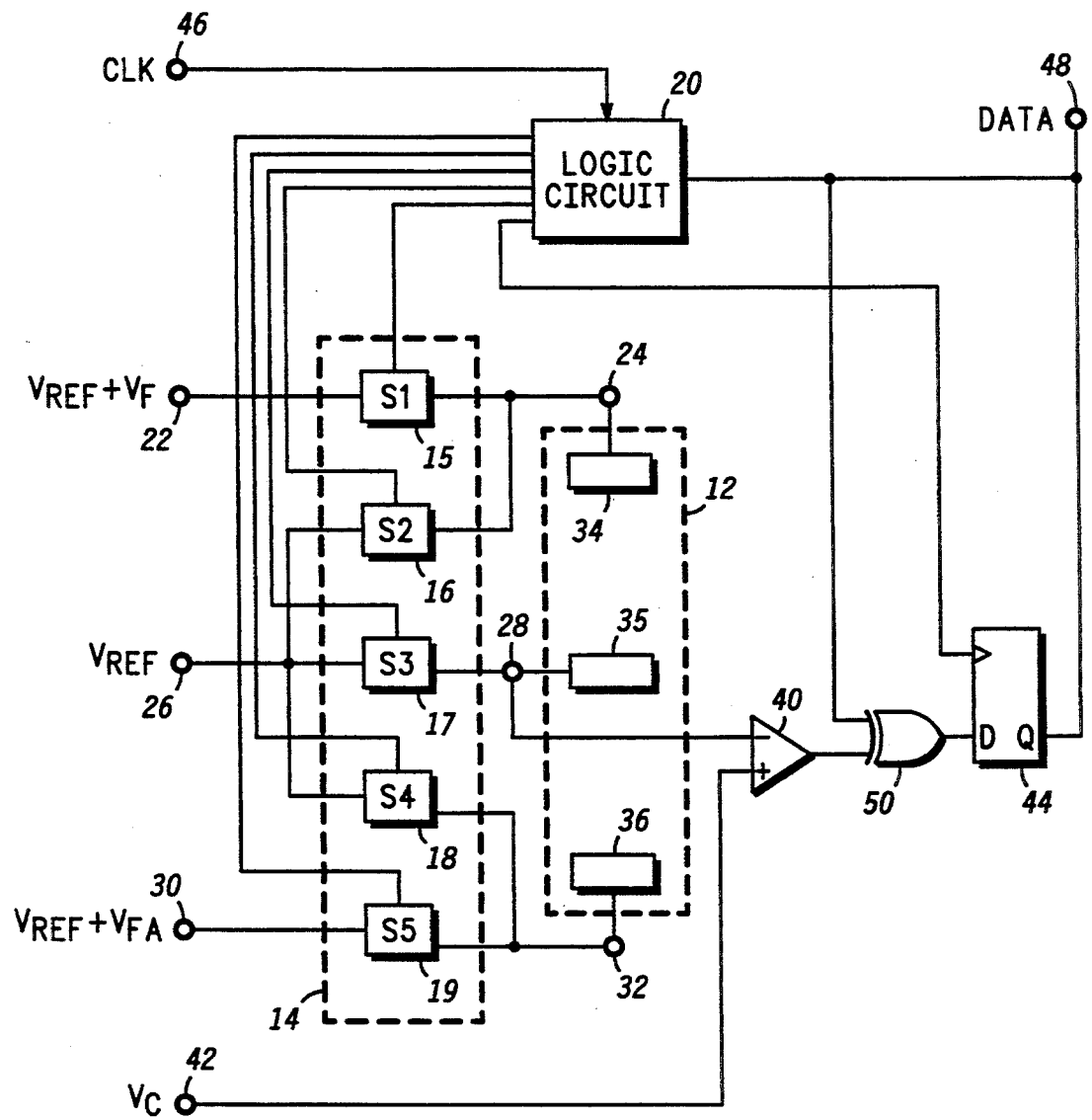
FIG. 2 is a block diagram of a second embodiment of a closed loop circuit for a differential capacitive sensor.

Referring to FIG. 2, a block diagram of a second embodiment of a closed loop circuit for controlling differential capacitor sensor 12 is shown. It is understood that components shown in FIG. 2 that are identical to components shown in FIG. 1 are identified by like reference numbers. The circuit shown in FIG. 2 further includes exclusive OR (XOR) gate 50 having a first input coupled to the output of comparator 40 and a second input coupled to the output of D flip-flop 44.

Further, the output of XOR gate 50 is coupled to the data input of D flip-flop 44.

The operation of the circuit of FIG. 2 is very similar to the operation of the circuit of FIG. 1 with the exception of the switch settings during the sense period. Now, due to the addition of XOR gate 50, the switch settings during the sense period are a function of the previous logic state of signal DATA. Referring to Table 2, the switch settings for the three different portions of the clock for the circuit of FIG. 2 are summarized.

TABLE 2

Settings for switches S1–S5 for each portion of the clock period for the circuit of FIG. 2.

| | FORCE PERIOD | | | SENSE PERIOD | |
|---|---|---|---|---|---|
| | DATA = 1 | DATA = 0 | RESET PERIOD | DATA = 1 | DATA = 0 |
| S1 | C | O | O | C | O |
| S2 | O | C | C | O | C |
| S3 | C | C | C | O | O |
| S4 | C | O | C | C | O |
| S5 | O | C | O | O | C |

From Table 2, it can be seen that if the previous logic state of signal DATA was a logic one, then the same switch settings for the circuit of FIG. 1 are utilized. As a result, the voltages at terminals 24 and 32 are the same as shown in EQNS. 3 and 4, respectively. However, if the previous logic state of signal DATA was a logic zero, then switches 15–19 are set to provide the following voltages at terminals 24 and 32.

$$V_{24} = V_{REF} \qquad \text{EQN. 6}$$

$$V_{32} = (V_{REF} + V_{FA}) \qquad \text{EQN. 7}$$

By setting up these equations and going through a similar example as aforedescribed for the circuit of FIG. 1, if $V_{28} > V_C$, then it is desired to invert the logic state of signal DATA, while if $V_{28} < V_C$, then it is desired to maintain the logic state of signal DATA. This can be easily accomplished with the use of XOR gate 50.

As an example, if $V_{28} > V_C$, a logic zero is applied to the second input of XOR gate 50. As a result, the previous logic state of signal data is exclusive OR'd with a logic zero which essentially supplies the same logic state of signal DATA to the D input of D flip-flop 44. As a result, logic circuit 20 will maintain switches 15–19 in their same positions and during the subsequent force period the same type of force will be applied as it was in the previous force period.

On the other hand, if $V_{28} < V_C$, a logic one is applied to the second input of XOR gate 50. As a result, the previous logic state of signal data is exclusive OR'd with a logic one which essentially inverts the previous logic state of signal DATA thereby providing it to the D input of D flip-flop 44. As a result, logic circuit 20 will change the state of switches 15–19, and during the next subsequent force period an opposite type of force will be applied to plate 35 than what was applied in the previous force period. Thus, in this embodiment, the sense period determines whether the same type of force or an opposite type of force is applied for the next force period.

Figure 3:
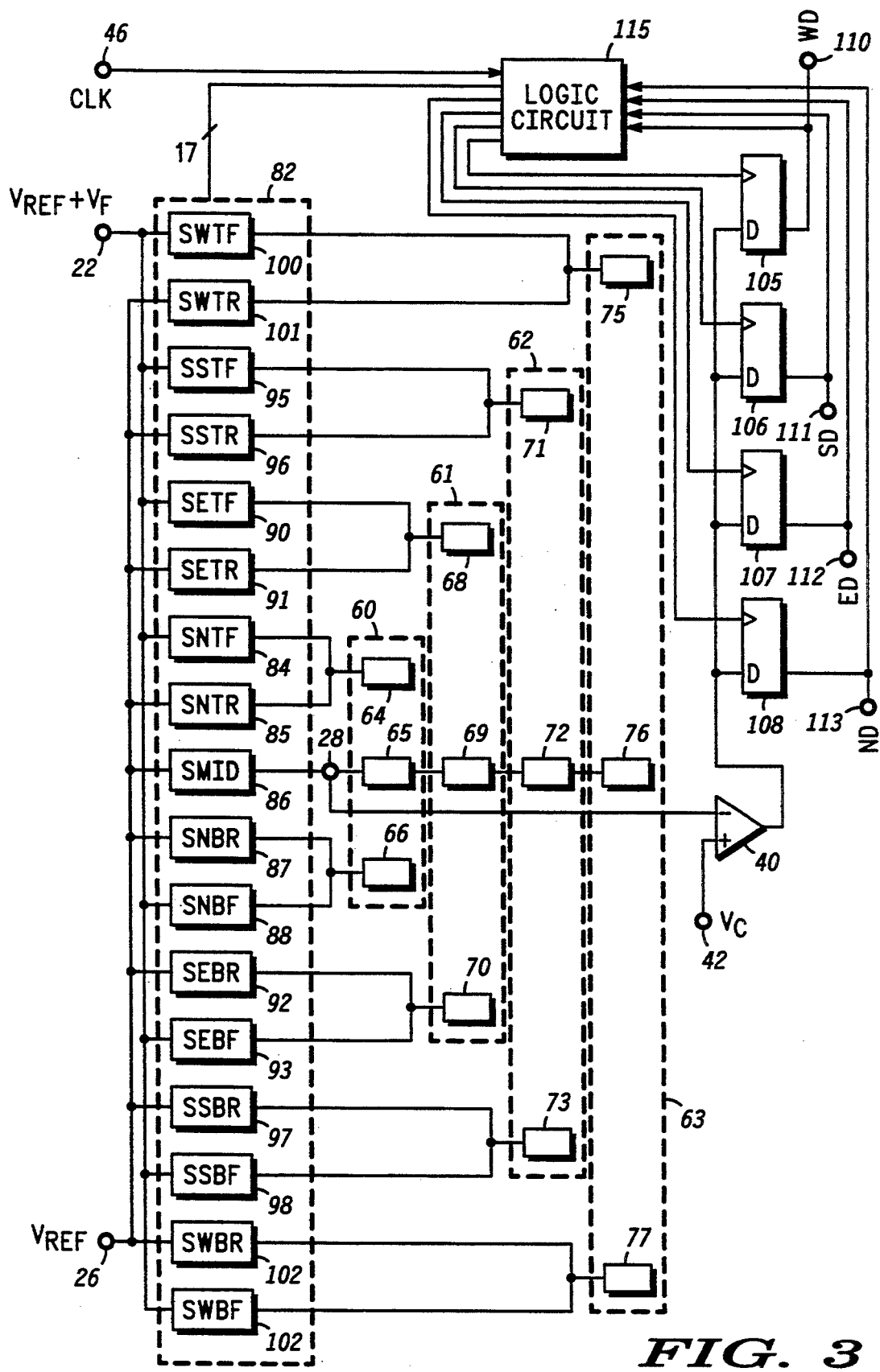
FIG. 3 is a block diagram of a third embodiment of a closed loop circuit for a differential capacitive sensor.

Turning now to FIG. 3, there is illustrated a third embodiment of a differential capacitive sensor which includes sensors 60–63 which are identical to differential capacitive sensor 12 shown in FIG. 1. It is understood that components shown in FIG. 3 which are identical to components shown in FIG. 1 are identified by the same reference numbers. Sensors 60–63 are respectively referred to as the west, north, east and south sensors.

Similar to differential capacitive sensor 12, differential capacitive sensors 60–63 each include a top, a middle and a bottom plate. In particular, sensor 60 includes top plate 64, middle plate 65 and bottom plate 66. Sensor 61 includes top plate 68, middle plate 69 and bottom plate 70. Also, sensor 62 includes top plate 71, middle plate 72 and bottom plate 73. Finally, sensor 63 includes top plate 75, middle plate 76 and bottom plate 77. It is understood that the drawing is no indication of the relative distances between the top, bottom and middle plates of each sensor. Rather, the distance shown between the plates are illustrated as such for convenience only.

As can be seen from FIG. 3, middle plates 65, 69, 72 and 76 of sensors 60–63, respectively, are tied to a common terminal, terminal 28.

Switching network 82 includes a plurality of switches similar to switches S1-S5 of FIG. 1. For example, focusing on sensor 60, switches 84–88 wherein it is understood that the voltage applied at terminal 22 of FIG. 1 is substantially the same voltage applied to terminal 30 of FIG. I which is shown as one common terminal 22 of FIG. 3.

Likewise, switches 90, 91, 86, 92 and 93 are configured with respect to plates 68–70 in an identical manner as aforedescribed for switches S1-S5 were for plates 34–36 of FIG. 1.

Switches 95, 96, 86, 97 and 98 are configured with respect to plates 71–73 in an identical manner as aforedescribed for switches S1-S5 were for plates 34–36 of FIG. 1.

Finally, switches 100, 101, 86, 102 and 103 are configured with respect to plates 75–77 in an identical manner as aforedescribed for switches S1-S5 were for plates 34–36 of FIG. 1.

The output of comparator circuit 40 is coupled to the data inputs of D flip flops 105–108. The outputs of D flip-flops 105–108 are respectively coupled to output terminals 110–113 for respectively providing signals WD, SD, ED and ND. Also, the outputs of D flip-flops 105–108 are respectively coupled to the first, second, third and fourth inputs of logic circuit 115.

The clock signal appearing at terminal 46 is applied to the fifth input of logic circuit 115. A first plurality of outputs of logic circuit 115, for example 17, are applied to the plurality of switches of switching network 82. Also, a second plurality of outputs of logic circuit 115, for example, four, are respectively applied to the clock inputs of D flip-flops 105–108.

The circuit of FIG. 3 includes four differential capacitive sensors wherein the middle plate of each sensor is electrically common and mechanically coupled to a central pivot point such that the common middle plates are free to move between its respective top and bottom plates. One example of a device that may be used to implement sensors 60–63 is fully disclosed in U.S. Pat. No. 5,249,465, having an issue date of Oct. 5, 1993, and assigned to the same assignee of the subject invention wherein the middle plates of each sensor is actually a common piece of polysilicon. By utilizing the circuit of FIG. 3, it is possible to detect rotational motion about the horizontal and vertical axis as well as linear motion which will be discussed in more detail hereinafter. The circuit of FIG. 3 has a clock period that in broken into the force period, the reset period and the sense period as aforedescribed for the circuit of FIG. 1. However, the sense period for the circuit of FIG. 3 includes four sub-periods:

1) sensing the north sensor (sensor 61);
2) sensing the east sensor (sensor 62)
3) sensing the south sensor (sensor 63); and
3) sensing the west sensor (60).

It is noted that, as before, the proper multiplexing of signals is required to ensure proper operation. The clock period is multiplexed with a force period which applies a force to move the middle plates towards either its respective top or bottom plate. The clock period is then followed by a reset period which applies substantially the same voltages to all plates (to negate charge injection effects as aforedescribed).

The clock period then senses the position of middle plate 69 with respect to plates 68 and 70 (north sensor) and provides either a logic one or a logic zero at the data input D flip-flop 108 in a similar manner as aforedescribed for the circuit of FIG. 1 wherein switches SNTF, SNTR, SMID, SNBR and SNBF of FIG. 3 correspond to switches S1-S5 of FIG. 1. The clock period then senses the position of middle plate 72 with respect to plates 71 and 73 (east sensor) and provides either a logic one or a logic zero at the data input D flip-flop 107 wherein switches SETF, SETR, SMID, SEBR and SEBF of FIG. 3 correspond to switches S1-S5 of FIG. 1. The clock period then senses the position of middle plate 76 with respect to plates 75 and 77 (south sensor) and provides either a logic one or a logic zero at the data input D flip-flop 106 wherein switches SSTF, SSTR, SMID, SSBR and SSBF of FIG. 3 correspond to switches S1-S5 of FIG. 1. Finally, the clock period then senses the position of middle plate 65 with respect to plates 64 and 66 (west sensor) and provides either a logic one or a logic zero at the data input D flip-flop 105 wherein switches SWTF, SWTR, SMID, SWBR and SWBF of FIG. 3 correspond to switches S1-S5 of FIG. 1. It is worth noting that flip-flops 108, 107, 106 and 105 are respectively clocked immediately after the sensing of north, east, south and west sensors via the signals appearing at the second plurality of outputs of logic circuit 115. Additionally, the data appearing at terminals 110-113 is fed back to logic circuit 115 so that the switches of switching network 82 can be properly opened or closed for the subsequent force period via the signals appearing at the first plurality of outputs of logic circuit 115. Also, the data appearing at terminals 110-113 respectively comprise signals WD, SD, ED and ND.

It is worth noting that a common force period can be used for all four sensors because during the force period voltage V<sub>REF</sub> is applied to the middle plates of all sensors. However, separate sense periods are required for each sensor because during the sense period, predetermined voltage is applied across the top and middle plate or the middle and bottom plate of each sensor in a similar manner as aforedescribed for the circuit of FIG. 1. For example, if middle plate 65 is closer to top plate 64 than it is to bottom plate 66, a predetermined voltage must be applied across plates 65 and 66 so as to attract middle plate 65 towards bottom plate 66 (a bottom force). Further, at the same time, substantially zero volts would be applied across plates 64 and 65 so as to deactivate any electrostatic force therebetween.

Referring to Table 3, the switch settings of switching network 82 are shown for the portions of the clock period.

TABLE 3

Switch settings for the switches of switching network 82 for each portion of the clock period.

| SWITCH | FORCE | | RESET | SENSE | | | |
|--------|-------|---|-------|---|---|---|---|
|        |       |   |       | N | E | S | W |
|        | ND = "1" | ND = "0" | | | | | |
| SNTF   | C | O | C | C | O | O | O |
| SNTR   | O | C | C | O | O | O | O |
| SMID   | C | C | C | O | O | O | O |
| SNBR   | C | O | C | C | O | O | O |
| SNBF   | O | C | C | O | O | O | O |
|        | ED = "1" | ED = "0" | | | | | |
| SETF   | C | O | C | O | C | O | O |
| SETR   | O | C | C | O | C | O | O |
| SMID   | C | C | C | O | O | O | O |
| SEBR   | C | O | C | O | C | O | O |
| SEBF   | O | C | C | O | O | O | O |
|        | SD = "1" | SD = "0" | | | | | |
| SSTF   | C | O | C | O | O | C | O |
| SSTR   | O | C | C | O | O | C | O |
| SMID   | C | C | C | O | O | O | O |
| SSBR   | C | O | C | O | O | C | O |
| SSBF   | O | C | C | O | O | O | O |
|        | WD = "1" | WD = "0" | | | | | |
| SWTF   | C | O | C | O | O | O | C |
| SWTF   | O | C | C | O | O | O | C |
| SMID   | C | C | C | O | O | O | O |
| SWBR   | C | O | C | O | O | O | C |
| SWBF   | O | C | C | O | O | O | O |

Each switch of switching network 82 is denoted by a four letter representation. The first letter is always S for switch. The second letter is either N, E, S or W which denotes whether the switch is for the north, east, south or west sensor, respectively. The third letter is either T or B which denotes whether the switch pertains to the top plate or the bottom plate, respectively. The fourth letter is either an F or R which denotes whether the switch is utilized to apply a force to, or to reset the plates, respectively.

Because the closed loop circuit of FIG. 3 includes the control and sensing of four sensors (60–63), rotational motion as well as linear motion of a device incorporating sensors 60–63 can be detected. For example, the data appearing at terminals 110–113 can be summed in the following manner to detect linear motion (MOTION$_{LIN}$).

$$\text{MOTION}_{LIN} = \{[\text{SUM}(\text{``}1\text{''}^S \text{ at ND}) + \text{SUM}(\text{``}1\text{''}^S \text{ at ED}) + \text{SUM}(\text{``}1\text{''}^S \text{ at SD}) + \text{SUM}(\text{``}1\text{''}^S \text{ at WD})] - [\text{SUM}(\text{``}0\text{''}^S \text{ at ND}) + \text{SUM}(\text{``}0\text{''}^S \text{ at SD}) + \text{SUM}(\text{``}0\text{''}^S \text{ at WD})]\}/N \quad \text{EQN. 8}$$

where SUM("1"$^S$ at ND), SUM("0"$^S$ at ND) are respectively the sum of the logic ones and logic zeroes appearing at output signal ND;

SUM("1"$^S$ at ED), SUM("0"$^S$ at ED) are respectively the sum of the logic ones and logic zeroes appearing at output signal ED;

SUM("1"$^S$ at SD), SUMC("0"$^S$ at SD) are respectively the sum of the logic ones and logic zeroes appearing at terminal output signal SD;

SUM("1"$^S$ at WD), SUM("0"$^S$ at WD) are respectively the sum of the logic ones and logic zeroes appearing at output signal WD; and N is the number of cycles in the averaging period.

Further, the data appearing at terminals 110–113 can be summed to detect rotation about the horizontal axis (MOTION$_{HOR}$) and the vertical axis (MOTION$_{VER}$) in the following manner.

$$\text{MOTION}_{HOR} = \{[\text{SUM}(\text{``1''}^S \text{ at ND}) + \text{SUM}(\text{``0''}^S \text{ at SD})] - [\text{SUM}(\text{``0''}^S \text{ at ND}) + \text{SUM}(\text{``1''}^S \text{ at SD})]\}/N \quad \text{EQN. 9}$$

$$\text{MOTION}_{VER} = \{[\text{SUM}(\text{``1''}^S \text{ at ED}) + \text{SUM}(\text{``0''}^S \text{ at WD})] - [\text{SUM}(\text{``0''}^S \text{ at ED}) + \text{SUM}(\text{``1''}^S \text{ at WD})]\}/N \quad \text{EQN. 10}$$

Although sensors 60–63 of FIG. 3 are shown being controlled by a closed loop circuit similar to the closed loop circuit shown in FIG. 1, it should be apparent that a closed loop circuit similar to the one shown in FIG. 2 (with the exclusive OR gate) could also have been utilized.

By now it should be apparent from the forgoing discussion that a novel closed loop circuit for controlling a differential capacitive sensor has been provided wherein the differential capacitive sensor includes a rigid top and bottom plate, and a movable middle plate. The closed loop circuit has a clock period which is divided into three separate sub-periods: the force period, the reset period and the sense period. During the force period, a top or a bottom electrostatic force is applied such that the middle plate is attracted towards the top plate or the bottom plate, respectively. During the reset period, substantially equal voltages are applied to all three plates. Finally, during the sense period, the voltage on the middle plate is sensed to determine whether the middle plate is closer to the top plate or to the bottom plate. Further, the result during the sense period will be utilized to determine whether to apply a top force or a bottom force during the next subsequent force period.

While the invention has been described in conjunction with specific embodiments thereof, it is evident that many alterations, modifications, and variations will be apparent to those skilled in the art in the light of the forgoing description. Accordingly, it is intended to embrace all such alterations, modifications, and variations in the appended claims.

I claim:

1. A closed looped circuit for a differential capacitive sensor, the differential capacitive sensor having first, second and third terminals, the closed loop circuit comprising;

switching means having a plurality of inputs, a plurality of outputs, and a plurality of control inputs, said plurality of inputs being responsive to a plurality of voltages, a first one of said plurality outputs being coupled to the first terminal of the differential capacitive sensor, a second one of said plurality of outputs being coupled to the second terminal of the differential capacitive sensor, a third one of said plurality of outputs being coupled to the third terminal of the differential capacitive sensor;

a comparator circuit having first and second inputs and an output, said first input of said comparator circuit being coupled to the second terminal of the differential capacitive sensor, said second input of said comparator circuit being coupled to receive a first reference voltage;

a flip-flop circuit having a data input, a clock input and an output, said data input of said flip-flop circuit being coupled to said output of said comparator circuit, and said output of said flip-flop circuit being coupled to provide an output data signal; and a logic circuit having first and second inputs and a plurality of outputs, said first input of said logic circuit being coupled to said output of said flip-flop circuit, said second input of said logic circuit being coupled to receive a clock signal, a portion of said plurality of outputs of said logic circuit being respectively coupled to said plurality of control inputs of said switching means, and one of said plurality of outputs of said logic circuit being coupled to said clock input of said flip-flop circuit.

2. The closed loop circuit according to claim 1 wherein said switching means includes:

a first switch having first and second terminals and a control terminal, said first terminal of said first switch being coupled to a first one of said plurality of voltages, said second terminal of said first switch being coupled to the first terminal of the differential capacitive sensor, and said control terminal of said first switch being coupled to a first one of said plurality of outputs of said logic circuit;

a second switch having first and second terminals and a control terminal, said first terminal of said second switch being coupled to a second one of said plurality of voltages, said second terminal of said second switch being coupled to the first terminal of the differential capacitive sensor, and said control terminal of said second switch being coupled to a second one of said plurality of outputs of said logic circuit;

a third switch having first and second terminals and a control terminal, said first terminal of said third switch being coupled to said second one of said plurality of voltages, said second terminal of said third switch being coupled to the second terminal of the differential capacitive sensor, and said control terminal of said third switch being coupled to a third one of said plurality of outputs of said logic circuit;

a fourth switch having first and second terminals and a control terminal, said first terminal of said fourth switch being coupled to said second one of said plurality of voltages, said second terminal of said fourth switch being coupled to the third terminal of the differential capacitive sensor, and said control terminal of said fourth switch being coupled to a fourth one of said plurality of outputs of said logic circuit; and a fifth switch having first and second terminals and a control terminal, said first terminal of said fifth switch being coupled to a third one of said plurality of voltages, said second terminal of said fifth switch being coupled to the third terminal of the differential capacitive sensor, and said control terminal of said fifth switch being coupled to a fifth one of said plurality of outputs of said logic circuit.

3. A closed looped circuit for a differential capacitive sensor, the differential capacitive sensor having first, second and third terminals, the closed loop circuit comprising;

switching means having a plurality of inputs, a plurality of outputs, and a plurality of control inputs, said plurality of inputs being responsive to a plurality of voltages, a first one of said plurality outputs being coupled to the first terminal of the differential capacitive sensor, a second one of said plurality of outputs being coupled to the second terminal of the differential capacitive sensor, a third one of said plurality of outputs being coupled to the third terminal of the differential capacitive sensor;

a comparator circuit having first and second inputs and an output, said first input of said comparator circuit being coupled to the second terminal of the differential capacitive sensor, said second input of said comparator circuit being coupled to receive a first reference voltage;

an exclusive OR gate circuit having first and second inputs and an output, said first input of said exclusive OR gate circuit being coupled to said output of said comparator circuit;

a flip-flop circuit having a data input, a clock input and an output, said data input of said flip-flop circuit being coupled to said output of said exclusive OR gate circuit, said output of said flip-flop circuit being coupled to said second input of said exclusive OR gate circuit and to provide an output data signal; and a logic circuit having first and second inputs and a plurality of outputs, said first input of said logic circuit being coupled to said output of said flip-flop circuit, said second input of said logic circuit being coupled to receive a clock signal, a portion of said plurality of outputs of said logic circuit being respectively coupled to said plurality of control inputs of said switching means, and one of said plurality of outputs of said logic circuit being coupled to said clock input of said flip-flop circuit.

4. The closed loop circuit according to claim 3 wherein said switching means includes:

a first switch having first and second terminals and a control terminal, said first terminal of said first switch being coupled to a first one of said plurality of voltages, said second terminal of said first switch being coupled to the first terminal of the differential capacitive sensor, and said control terminal of said first switch being coupled to a first one of said plurality of outputs of said logic circuit;

a second switch having first and second terminals and a control terminal, said first terminal of said second switch being coupled to a second one of said plurality of voltages, said second terminal of said second switch being coupled to the first terminal of the differential capacitive sensor, and said control terminal of said second switch being coupled to a second one of said plurality of outputs of said logic circuit;

a third switch having first and second terminals and a control terminal, said first terminal of said third switch being coupled to said second one of said plurality of voltages, said second terminal of said third switch being coupled to the second terminal of the differential capacitive sensor, and said control terminal of said third switch being coupled to a third one of said plurality of outputs of said logic circuit;

a fourth switch having first and second terminals and a control terminal, said first terminal of said fourth switch being coupled to said second one of said plurality of voltages, said second terminal of said fourth switch being coupled to the third terminal of the differential capacitive sensor, and said control terminal of said fourth switch being coupled to a fourth one of said plurality of outputs of said logic circuit; and a fifth switch having first and second terminals and a control terminal, said first terminal of said fifth switch being coupled to a third one of said plurality of voltages, said second terminal of said fifth switch being coupled to the third terminal of the differential capacitive sensor, and said control terminal of said fifth switch being coupled to a fifth one of said plurality of outputs of said logic circuit.

5. A method for sensing and controlling a differential capacitive sensor, the differential capacitive sensor having first, second, and third terminals respectively coupled to first, second and third plates, the method comprising the steps of:

(a) sensing a force applied to the differential capacitive sensor;

(b) sensing a voltage change appearing at the second terminal of the differential capacitive sensor in response to said force sensed and providing a corresponding logic state of a data signal;

(c) forcing predetermined voltages at the first, second and third terminals of the differential capacitive sensor in response to a logic state of said data signal so as to maintain the second plate centrally located between the first and third plates; and (d) setting the voltages at the first, second and third terminals of the differential capacitive sensor to substantially equal voltages.

6. A closed looped circuit for a plurality of differential capacitive sensors, each one of the plurality of differential capacitive sensors having first, second and third plates, the closed loop circuit comprising;

switching means having a plurality of inputs, a plurality of outputs, and a plurality of control inputs, said plurality of inputs being responsive to a plurality of voltages, said plurality of outputs being respectively coupled to the first, the second and the third plates of the plurality of differential capacitive sensors wherein the second plates of each of the plurality of differential capacitive sensors are electrically common and mechanically coupled;

a comparator circuit having first and second inputs and an output, said first input of said comparator circuit being coupled to one of said plurality of outputs of said switching means, said second input of said comparator circuit being coupled to receive a first reference voltage;

a plurality of flip-flop circuits each having a data input, a clock input and an output, said data input of each one of said plurality of flip-flop circuits being coupled to said output of said comparator circuit; and a logic circuit having a plurality of inputs and first and second plurality of outputs, a first one of said plurality of inputs of said logic circuit being coupled to receive a clock signal, a portion of said plurality of inputs of said logic circuit being coupled to said outputs of said plurality of flip-flop circuits, said first plurality of outputs of said logic circuit being respectively coupled to said plurality of control inputs of said switching means, and said second plurality of outputs of said logic circuit being respectively coupled to said clock inputs of said plurality of flip-flop circuits.

* * * * *

UNITED STATES PATENT AND TRADEMARK OFFICE
CERTIFICATE OF CORRECTION

PATENT NO.   : 5,428,352
DATED        : June 27, 1995
INVENTOR(S)  : Paul T. Bennett It is certified that error appears in the above-indentified patent and that said Letters Patent is hereby corrected as shown below:

In column 14, line 24, claim 5, delete "a" and insert therfor --said--.

Signed and Sealed this

Third Day of October, 1995

Attest:

BRUCE LEHMAN

Attesting Officer

Commissioner of Patents and Trademarks